United States Patent
Bühler

(10) Patent No.: US 7,053,169 B2
(45) Date of Patent: May 30, 2006

(54) POLYAMIDE MOLDING COMPOUNDS FOR PRODUCING OPTICAL LENSES

(75) Inventor: Friedrich Severin Bühler, Thusis (DE)

(73) Assignee: Ems-Chemie AG, Reichenauerstrasse (CH)

( * ) Notice: Subject to any disclaimer, the term of this patent is extended or adjusted under 35 U.S.C. 154(b) by 18 days.

(21) Appl. No.: 10/474,956

(22) PCT Filed: Apr. 18, 2002

(86) PCT No.: PCT/EP02/04314

§ 371 (c)(1),
(2), (4) Date: Apr. 12, 2004

(87) PCT Pub. No.: WO02/090421

PCT Pub. Date: Nov. 14, 2002

(65) Prior Publication Data

US 2004/0158028 A1    Aug. 12, 2004

(30) Foreign Application Priority Data

May 8, 2001 (DE) ................................ 101 22 188

(51) Int. Cl.
*C08G 69/08* (2006.01)
*C08G 69/26* (2006.01)
*C08L 77/00* (2006.01)
*B29D 11/00* (2006.01)
*B29D 12/00* (2006.01)

(52) U.S. Cl. ............... 528/310; 528/331; 528/332; 528/335; 528/336; 528/338; 528/339; 528/340; 528/346; 528/347; 524/538; 524/606; 524/607; 525/422; 525/432; 428/411.1; 428/474.4; 264/1.1; 264/1.6; 264/1.9; 264/2.7; 264/299; 264/319; 264/320; 264/328.1

(58) Field of Classification Search .............. 528/331, 528/310, 332, 335, 336, 339, 338, 340, 346, 528/347; 524/606, 607, 538; 428/411.1, 428/474.4; 264/1.1, 1.6, 1.9, 2.7, 299, 319, 264/320, 328.1

See application file for complete search history.

(56) References Cited

U.S. PATENT DOCUMENTS

| | | | | |
|---|---|---|---|---|
| 3,627,736 A * | 12/1971 | Raum et al. | ............... | 528/338 |
| 4,014,957 A * | 3/1977 | Kirsch et al. | ............... | 525/425 |
| 4,731,421 A * | 3/1988 | Hoppe et al. | ............... | 525/432 |
| 4,847,356 A * | 7/1989 | Hoppe et al. | ............... | 528/346 |
| 5,028,462 A * | 7/1991 | Matlack et al. | ............ | 428/35.7 |
| 5,049,156 A * | 9/1991 | Higashi et al. | ............ | 623/6.56 |
| 5,700,900 A * | 12/1997 | Hewel et al. | ............... | 528/335 |
| 5,886,087 A * | 3/1999 | Dalla Torre | ............... | 524/538 |
| 5,917,001 A * | 6/1999 | Laederach et al. | ........ | 528/322 |
| 6,063,862 A * | 5/2000 | Idemura et al. | ............ | 524/606 |
| 6,204,355 B1* | 3/2001 | Dalla Torre et al. | ........ | 528/310 |
| 6,528,560 B1* | 3/2003 | Buhler | ............... | 524/123 |
| 6,831,137 B1* | 12/2004 | Torre et al. | ............... | 525/432 |
| 6,943,231 B1* | 9/2005 | Buhler | ............... | 528/310 |

* cited by examiner

Primary Examiner—P. Hampton Hightower
(74) Attorney, Agent, or Firm—J.C. Patents

(57) ABSTRACT

The invention relates to new thermoplastically processible transparent polyamide molding materials based on copolyamides containing diamines and dicarboxylic acids with aromatic cores which exhibit a high index of refraction $n_D^{20}$ over 1.59 and a low density under 1.3 g/cm$^3$. At the same time, a low birefringence, high hardness, and scratchresistance are achieved. The polyamide molding materials are fabricated by means of conventional pressure reactors (autoclaves) according to a modified technique. The granulate that is produced from the inventive molding materials is reshaped by thermoplastic processes like injection molding, particularly in multichamber cavity tools. The invention also relates to the utilization of the inventive molding materials for producing optical lenses.

30 Claims, No Drawings

POLYAMIDE MOLDING COMPOUNDS FOR PRODUCING OPTICAL LENSES

The invention relates to new thermoplastically processible transparent polyamide molding materials based on copolyamides containing diamines and dicarboxylic acids with aromatic cores which exhibit a high index of refraction $n_D^{20}$ over 1.59, preferably over 1.60, and a low density under 1.3 g/cm$^3$. At the same time, a low birefringence, high hardness, and scratchresistance are achieved.

The inventive polyamide molding materials are fabricated by means of conventional pressure reactors (autoclaves) according to a modified technique. The granulate that is produced from the inventive molding materials is reshaped by thermoplastic processes like injection molding, particularly in multichamber cavity tools.

The invention also relates to the utilization of the inventive molding materials based on special copolyamides for producing optical lenses. For optical lenses, a very low birefringence is desired in order to prevent the formation of color rings or unsharp pictures.

The term "transparent polyamides" refers herein to (co) polyamide(s) (i.e. molding materials therefrom) whose transmission factor equals at least 70% when the polyamide is in the form of a thin lens with a thickness of 2 mm.

Optical lens blanks are manufactured primarily from high-shrinkage casting resins which are hardened for several hours in a mold by UV-activated hardeners. The curing process is frequently associated with a volume loss of 20% or more. Complex geometries can no longer be demolded. An advantage of this method is that the casting resins can be loaded with components that achieve high indexes of refraction of >1.60 and high hardnesses and heat distortion temperatures. The high hardness protects the material against surface damage. The main disadvantage consists in the long curing times, which can last up to 40 hours, and the relatively complicated formulations, which are poured into high-purity molds.

The speed of fabrication rises many times over for optical lenses that can be molded according to the injection molding method. Handling is much easier compared to the reactive casting resins. Highly complicated geometries can be produced. With the known technique of back injection, composites with other polyamides can be produced. Today, mainly amorphous plastics like PMMA polymethylmethacrylate) or PC (polycarbonate) are utilized for lenses. An advantage of PMMA is the low processing temperature, high transparency, and high hardness. Its disadvantages are the low heat distortion temperature and low index of refraction $n_D^{20}$ of 1.49. The advantage of PC is its excellent viscosity and an average index of refraction of 1.59. On the other hand, its disadvantages are its low hardness and low chemical resistance.

PS (polystyrols) or COC (cycloolefin copolymers) with high heat distortion temperatures are additional amorphous plastics which are suitable for lens production. Their indexes of refraction show similar values as polycarbonate. The disadvantages of polystyrol are its low toughness, low heat distortion temperature, and low chemical resistance.

In order to set higher indexes of refraction and lower dispersion, corresponding additives with a high electron density and high polarizing capability can be added to the cited molding compounds. In general, heavy atoms such as iodine or metal salts in suitable compounds can be utilized for this. Alternatively, surface varnishes can be used, which improve properties such as index of refraction, dispersion, transmission, and hardness.

Normally, thermoplastic, semi-crystalline and thus non-transparent polyamide molding compounds consisting substantially of aliphatic or aromatic dicarboxylic acids and aliphatic diamines are produced in the pressure autoclaves that are customary for polyamide production. In these methods, temperatures between 250 and 350° C. and pressures between 10 and 20 bars are applied. At the end of the reaction, a polymer melt is formed, which is discharged in strand form by nozzles, cooled in a water bath, and cut into granulate. The granulate is then re-melted in extruders and reformed into extrusion or injection molded products.

Transparent thermoplastic polyamide molding compounds are produced from monomers according to the same method, whereby crystallite formation is suppressed by comonomers. Products with a high proportion of aromatics frequently comprise high glass temperatures and high viscosities and can no longer be discharged from the autoclaves owing to low fluidity. In order to increase the fluidity, aliphatic comonomers are integrated, which reduce the glass temperature.

However, thermoplastic transparent polyamide molding materials for optical applications with indexes of refraction $n_D^{20}$ over 1.6, densities under 1.3 g/cm$^3$, high hardness and low glass transition temperature which can be produced from the melt in an autoclaving method and processed in injection molding systems are not yet known.

U.S. Pat. No. 4,843,141 describes thermoplastic polyester amides which are produced according to known autoclaving processes with 2,2-substituted biphenyl radicals which are suitable for producing films and fibers. The formation of anisotropic melts up to 350° C. is an essential feature. In U.S. Pat. No. 4,355,132, anisotropic melts are achieved up to 400° C. m both cases, the liquid-crystalline characteristics are in the foreground.

U.S. Pat. No. 4,446,305 describes possible modules for transparent polyamides with indexes of refraction of up to 2.0. The object is the fabrication of transparent products with high birefringence. The production is performed from solution, usually a solution of N-methylpyrolidone similarly to U.S. Pat. No. 4,384,107 and U.S. Pat. No. 4,520,189 at low temperatures on lab scale, whereby preferably aromatic reactive acid chlorides are utilized, which react with diamines even at room temperature. The disadvantage here is that the solvent has to be removed, and the removal of the HC1 requires complicated washing steps. The special dicarboxylic acids or diamines that are needed for setting high indices of refraction normally do not comprise sufficient thermal stability for a melt condensation in an autoclaving process at 200 to 300° C.

Various transparent products based on polyimide and polyetherimide with Tg>235° C. are known from U.S. Pat. No. 4,216,321 and must be produced from solvent at low temperatures and remolded in order to prevent thermal damage or discoloration.

U.S. Pat. No. 5,049,156 describes transparent polyamides with imide structures for lenses which are built from aromatic tetracarboxylic acids and aromatic diamines which are converted into amino acids at 80° C. in organic solvents. When the solvent is distilled off under a vacuum, ring closure occurs, whereby imide is formed. Corresponding molded bodies or films are produced from solution and can be remolded in heated presses at 200 to 400° C. and cured. The resulting indexes of refraction $n_D^{20}$ range from 1.6 to 1.7.

EP-A-556 646 describes reactive epoxy casting resins with xylylenediamine components, which resins are utilized for producing cast lenses with indexes of refraction $n_D^{20}$ of 1.58.

GB-A-1420741 describes hydrodynamic contact lenses consisting of transparent thermoplastic polyamide molding compounds with trimethylhexamethylenediamine and terephthalic acid with a higher refractive power than PMMA but with an index of refraction $n_D^{20}$ under 1.59.

The patents JP 09012716 and JP 09012712 describe transparent thermoplastic polyamides that are produced from dimerized or trimerized fatty acids or diamines with 11 to 22 C atoms and ethylenediamine by a polycondensation method. The injection molding yields transparent lenses with a density of 0.957, light transmission of 91.2%, and a relatively low index of refraction $n_D^{20}$ of 1.496.

EP-A-619 336 describes transparent thermoplastic polyamide molding composition that are produced by polycondensation from bis-(4-aminocyclohexyl)methane and up to 65% of another diamine, converted with dodecanoic dicarboxylic acid. Injection-molded transparent lenses exhibit low indexes of refraction $n_D^{20}$, i.e. about 1.51.

EP-A-837 087 describes transparent thermoplastic polyamide molding composition that are produced by polycondensation from cycloaliphatic $C_{14}$–$C_{22}$ diamines with aliphatic $C_8$–$C_{14}$ dicarboxylic acids or aliphatic $C_8$–$C_{14}$ diamines with cycloaliphatic $C_7$–$C_{36}$ dicarboxylic acids, which can be replaced up to 50% by aromatic dicarboxylic acids. Injection-molded transparent lenses comprise densities of about 1.01 g/cm$^3$, indexes of refraction $n_D^{20}$ of 1.51 and Abbe coefficients of 52.

JP-A-3050264 describes blends of (A) transparent thermoplastic polyamide molding composition that are produced from hexamethylenediamine or alicyclic diamines such as bis-(4-amino-3-methylcyclohexyl)methane or bis-(4-amino-3-methylcyclohexyl)propane and aromatic dicarboxylic acids such as isophthalic acid or terephthalic acid and (B) aliphatic polyamides such as PA46 (polyamide 46), PA66, PA610, PA6, PA11. Indexes of refraction $n_D^{20}$ under 1.59 can be achieved with these systems.

JP-A-3033157 describes blends of (A) 90% transparent thermoplastic polyamide molding composition, produced from hexamethylenediamine or alicyclic diamines such as bis-(4-amino-3methylcyclohexyl)methane propane and aromatic dicarboxylic acids like isophthalic acid or terephthalic acid and (b) 10% semiaromatic polyamide built from aromatic dicarboxylic acids and aliphatic diamines or aliphatic dicarboxylic acids and aromatic diamines. Indexes of refraction $n_D^{20}$ under 1.60 can be achieved with these systems.

JP-A-62204201 describes transparent thermoplastic polyamide molding composition that are produced from caprolactam, hexamethylenediamine and 2,2,4-trimethylhexamethylenediamine and terephthalic acid (6/6T/3-6T) for optical lenses with the advantage of a high heat distortion temperature and a high dimensional stability. But the index of refraction $n_D^{20}$ is far below 1.6.

EP-A-345 810 describes colorless transparent polyamides for lenses that are produced from 2,2-bis(3,4 dicarboxyphenyl)hexafluoropropanedianhydride and aromatic diamines in meta position or 1,4 disubstituted dibenzylmethane or propane or $CF_3$ or $SO_2$ in meta position with a refractive index of >1.6. The densities of these lenses are a relatively high 1.33 to 1.44 g/cm$^3$. The disadvantage is the fabrication in organic solvents at 80° C., which require a complicated drying process. The lenses are produced by a casting technique with the aid of solvents. It is not specified whether the material is thermoplastically processible in injection molding machines.

The object of the invention is thus to provide thermoplastic transparent polyamide molding material based on special copolyamides which have a higher refractive index $n_D^{20}$ (>1.6) than PMMA, PC, PS and COC and a low density, which do not exceed the processing temperatures of PC, and which exhibit the highest possible hardness and rigidity.

This object is inventively achieved by the molding composition according to claim 1, the method according to claim 13, and the optical lenses according to claims 17 and 18. Advantageous embodiments of the invention derive from the subclaims.

Surprisingly, the invention establishes that transparent polyamide molding composition based on copolyamides, containing diamines with aromatic cores, with high refractive indices $n_D^{20}$ above 1.6 and very low densities under 1.3 g/cm$^3$, high hardness, low birefringence, and suitable melt viscosity and glass temperatures between 120 and 170° C. can be produced from certain combinations of monomers, such as those cited in patent claims 1 to 12, in a pressure autoclave by a modified method. A particular advantage of the inventive polyamide molding material for thermoplastic lens material consists in the simple and rational forming. The fabrication time for lenses in an injection molding method that is customary for polyamides is seconds long, whereas the curing processes for lenses that consist of reactive casting resins require several hours.

The refractive index can be varied broadly by changing the monomer composition of the copolyamide. Materials with different indexes of refraction can be randomly combined in layers according to compound injection molding methods. Finishes of all kinds for stabilization, coloration, strengthening, and so on, can then be incorporated by means of additional compounding methods such as extrusion.

The production of the inventive molding material, i.e. the condensation, occurs on ordinary pressure autoclaves but according to a modified method. What is critical here is that no processing step exceeds 4 bars of pressure in the autoclave. The remolding of the inventive molding material then occurs by ordinary thermoplastic processes. Compared to known materials like PMMA (polymethylmethacrylate) or PC (polycarbonate), optically relevant characteristics like high refractive index, hardness, and high heat distortion temperature were realized in one product. Besides the advantageous combination of characteristics for optical applications, molded parts produced from the inventive molding material have the outstanding chemical resistance for which polyamides are known. For example, for optical lenses, a very low birefringence is desirable in order to prevent color ring formations and unsharp pictures.

The particular advantage of the inventive molding material is the ability to produce complicated optical components by injection molding, for instance, owing to the outstanding fluidity. Furthermore, various combinations of chemically compatible materials are possible in this method, whose optical characteristics can be variably set. This allows the construction of superior technical parts made of resistant polyamides, it being possible to simultaneously integrate a resistant polyamide optical lens into the molded part by exploiting the adhesion of polyamide to polyamide.

Another advantage of the inventive molding material is the high refractive index $n_D^{20}$ above 1.6 given at relative low densities below 1.3 g/cm$^3$. This allows the production of light weight but strongly refractive lenses with a substantial comfort advantage.

Further advantage is gained by the high hardness of the material, which greatly simplifies processing steps such as post-processing and grinding of the lens blank and which resembles the standard cast lens material alyldiglycolcarbonate CR39. High hardnesses additionally manifest excellent surface resistance against mechanical damage and can thus obviate surface refining steps such as the cited hardcoats or other protective varnishes.

Further essential advantages of the inventive polyamide molding material are the high rigidity and hardness of the lenses, whereby the processing and polishing steps are substantially simplified and can be performed with finishes that are used for processing the standard lens CR 39.

Suitable inventive transparent thermoplastic polyamide molding compositions contain aromatic dicarboxylic acids such as isophthalic acid, terephthalic acid, or naphthalenedicarboxylic acid, either individually or as a blend, whereby the isophthalic acid forms the largest portion. Of course, the corresponding esters or other substituted derivates can also be utilized. The crystallization behavior can be influenced by the purposeful selection of different symmetrical or asymmetrical isomers of the naphthalene dicarboxylic acid. A portion of the aromatic dicarboxylic acids, i.e. up to 5 mol %, can be replaced by aliphatic dicarboxylic acids with 2 to 12 ($CH_2$) units.

Inventively suitable diamines preferably contain aromatic cores such as meta-xylylene diamine or para-xylylene diamine or come from the aromatic diamine group or the substituted aromatic diamine group and can be used individually or as a blend. The lesser share of the aromatic diamines can be replaced up to 5 mol % by aliphatic or cycloaliphatic diamines with 2 to 12 $CH_2$ groups.

The inventive copolyamide-based transparent thermoplastic polyamide molding materials with a refractive index $n_D^{20}$ above 1.59, preferably above 1.6, contain a predominant proportion by weight of diamines and dicarboxylic acids with aromatic cores, characterized by the following chains, represented by Formula (I):

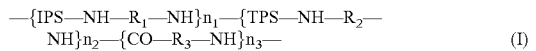

where:

$n_1$=40 to 100 wt %

$n_2$=60 to 0 wt %

$n_3$=0 to 30 wt %, and where the proportions, in wt %, of $n_1$, $n_2$, and $n_3$ total 100%, whereby the diamines with the cores $R_1$, $R_2$ can be identical or different, and the diamines consist of para-xylylene or meta-xylylene units and can consist of linear aliphatic or branched aliphatic chains with 2 to 12 ($CH)_2$ units or chains with cycloaliphatic cores which are incorporated individually or as blends, and whereby 100 mol % of the dicarboxylic acids consist of at least 40 mol % isophthalic acid (IPS) and, as a residue, terephthalic acid, which can be replaced partly or wholly by naphthalenedicarboxylic acids.

Up to 30 wt % of the copolyamides of the molding compounds can be replaced by amino acids or lactams with core $R_3$, consisting of 5 to 11 ($CH_2$) chain units.

A copolyamide composition according to Formula II is preferred:

MXDI/MXDT/6I/6T (II)

With the following mol % proportions of the respective components:

20 to 100 mol % meta-xylylenediamine (MXD)

80 to 0 mol % hexamethylenediamine (6)

50 to 100 mol % isophthalic acid (I) and 50 to 0 mol % terephthalic acid (T) in relation to 100 mol % diamine and 100 mol % dicarboxylic acids, whereby meta-xylylenediamine can be wholly or partly replaced by para-xylylenediamine, and terephthalic acid wholly or partly by naphthalenedicarboxylic acid, whereby symmetric or asymmetric isomers or blends thereof can be utilized. Asymmetric isomers are preferred.

A copolyamide composition according to Formula II is particularly preferred:

MXDI/MXDT/6I/6T (II)

With the following mol % portions of the respective components:

20 to 80 mol % meta-xylylenediamine (MXD)

80 to 20 mol % hexamethylenediamine (6)

60 to 80 mol % isophthalic acid (I) and 40 to 20 mol % terephthalic acid (T) in relation to 100 mol % diamine and 100 mol % dicarboxylic acids.

A copolyamide according to Formula III is also particularly preferred:

6I/6T/6NDC (III)

with the following proportions, in mol %, of the respective components:

20 to 80 mol % naphthalenedicarboxylic acid (NDC), with symmetric or asymmetric substitute positions or combinations thereof, whereby 2,6-naphthalenedicarboxylic acid is preferred, 40 to 20 mol % isophthalic acid (I), 40 to 0 mol % terephthalic acid (T) and 100 mol % hexamethylenediamine (6), which can be wholly or partly replaced by ethylenediamine, trimethylhexamethylenediamine, or linear diamines with 8 to 12 $CH_2$ groups or by cycloaliphatic diamines such as norbomanediamine, 4,4-diaminodicyclohexylmethane,3,3-dimethyl-4,4-diaminodicyclohexylmethane or blends thereof, in relation to 100 mol % diamine and 100 mol % dicarboxylic acids.

Inventively suitable diamines with aromatic cores encompass meta-xylylenediamine and/or para-xylylenediamine, which can be contained in copolyamide in a proportion of at least 50 mol % in relation to 100 mol % diamine.

The diamines with aromatic cores or the aromatic dicarboxylic acids in the inventive copolyamides can be replaced up to 5 mol % with branched or unbranched aliphatic diamines with 2 to 12 $CH_2$ units or aliphatic dicarboxylic acids with 2 to 12 $CH_2$ units.

Suitable cycloaliphatic diamines or cycloaliphatic dicarboxylic acids contain skeletons such as norbornyl, cyclohexyl, or dicyclohexyl methane, dicyclohexylpropane, di(methylcyclohexyl)methane, or di(methylcyclohexyl)propane. Said cycloaliphatic diamines or cycloaliphatic dicarboxylic acids can contain up to 5 mol % of the cited cycloaliphatic diamines or cycloaliphatic dicarboxylic acids.

Suitable dicarboxylic acids with aromatic cores are: isophthalic acid (IPS), terephthalic acid (TPS), naphthalene dicarboxylic acid with different symmetrical and asymmetrical isomers, blends thereof which are incorporated as acids or esters thereof, and combinations of these.

In order to accelerate the reaction during the polycondensation of the inventive copolyamides, corresponding phosphorous catalysts such as $H_3PO_2$, $H_3PO_3$, $R_3PO_4$ can be added to the aqueous mixture in amounts between 0.01 and 0.2 wt %.

m order to stabilize the color in the course of the polymerization and later processing, phosphorous stabilizers of the type $R_3PO_2$, $R_3PO_3$, or $R_3PO_4$ can be integrated in amounts between 0.01 to 0.2 wt % in the form of the acids with R=H or metal ions or organic linear or cyclic residues in amounts between 0.01 and 0.2 wt %, or suchlike containing sterically hindered phenols.

m order to control the chain length, either monofunctional amines or mono functional acids are polymerized in, or an excess of diamine or dicarboxylic acid is used. The acids used as monofunctional acids are specifically from the benzoic, acetic, and propionic groups. Hexyl and/or cyclohexyl amine are used as amines. Controller types with stabilizer functions, such as multi-substituted piperidyl groups and tertiary butylphenyl groups are particularly preferred.

The inventive copolyamides exhibit a relative viscosity in the range of 1.33 to 1.65, measured in 0.5% m-cresol.

The inventive polyamide compositions—that is to say, molding materials—can additionally contain conventional additives that are known to the person skilled in the art. In particular, the inventive molding materials contain additives such as UV absorbers which filter out UV light under 400 nm, dyes for tinting the lenses, or thermotropic or thermochromatic additives which change the tint depending on temperature or depending on the wavelength of incident light, or isorefractive grafted core-cladding polymers for enhancing impact strength, or lubricants, or additional processing aids or isorefractive strengtheners like glass fibers or spheres or anti-bloom agents.

The inventive molding materials are produced in an autoclave by a known condensation method whose unique feature is that no processing step exceeds a boiler pressure of 10 bars, or preferably 4 bars. At higher pressures, these diamines with aromatic cores tend to develop branchings which drastically increase melt viscosity, for instance at 260° C., and thus make discharge from the reactors impossible.

The cited compounding methods in the extruder represent suitable methods for incorporating desired additives such as UV absorbers which filter out UV light under 400 nm, dyes for tinting the lenses, thermotropic or thermochromatic additives which alter the tint depending on temperature or depending on the wavelength of the incident light, or isorefractive grafted core-cladding polymers for impact strength.

Any known method for thermoplastics, particularly injection molding in multi-cavity tools, is suitable for remolding the granulate that is produced from the molding materials into optical lenses, i.e. lens blanks.

The inventive molding materials also make possible the production of composite lenses from back-injected films or other molded parts which have polarization characteristics or which are equipped with UV absorbers, for instance absorbers that filter UV light under 400 nm, dyes for tinting the lenses, or thermotropic or thermochromatic additives which alter the tint depending on the temperature or the wavelength of incident light. Furthermore, the chemical resistance or the mechanical stress resistance and the antifriction or abrasion behavior can also be influenced by composite lenses that are produced by the back-injection of protective films with the lens material.

Suitable applications of the inventive high-refraction molding materials encompass lenses for eyeglasses, cameras, binoculars, microscopes, electro-optical measuring and testing devices, optical filters, headlight lenses, lamp lenses, projectors, video projectors, viewing windows and gage glasses.

For refining surfaces of the molded body that is produced, the known methods can be used, such as varnishing with hardcoat, softcoat, or UV protection varnish, evaporation coating with carbon or metal atoms, plasma treatment and layer polymerization.

These inventive molding materials can of course be used as blend components in other amorphous or semi-crystalline polyamides and furnished with the ordinary strengtheners, nanoparticles, impact strength modifiers, dyes, flame retardants, softeners, stabilizers, and lubricants.

The following Examples 3 to 9 serve for illustration, whereas Examples 1 and 2 deal with the fabrication and characteristics of the known products Grilamid® TR55 and Grivory® G21.

REFERENCE EXAMPLE 1

(VB1)

Suspend 13.4 kg laurine lactam, 10.7 kg isophthalic acid, 15.7 kg cycloaliphatic diamine (Laromin 260, BASF), 190 g benzoic acid in 40 kg water in a 130 1 pressure autoclave and heat 2 hours at 260° C., while limiting the pressure to approx. 20 bars by releasing the steam. In a pressure phase, continue the reaction for 3 hours at 290° C. and 20 bars, and then in a expansion phase lower the pressure slowly to 1 bar and degas for approx. 3 hours more. After the desired agitator torque is reached, empty the mixture through boreholes of approx. 5 mm. Conduct the emerging polymer strands through a water bath, cool them, and cut into granulate. Next, dry for 12 hours at 90° C. in a tumble drier under nitrogen. There emerges a colorless, glassy polyamide with a glass point of 165° C. and a relative viscosity of 1.55, measured in 0.5% m-cresol solution. The characteristics of the polymer are summarized in Table 1.

The fabrication of molded parts from the dried granulate is performed on an Arburg injection molding machine. The melt temperature is set between 270 and 290° C., while the mold temperature is between 60 and 80° C. The characteristics of the molded parts are summarized in Table 1.

REFERENCE EXAMPLE 2

(VB2)

Suspend 14.4 kg hexamethylenediamine, 13.6 kg isophthalic acid, 6.8 kg terephthalic acid, and 125 g acetic acid in 40 kg water in a 130 1 pressure autoclave and heat 2 hours at 280° C. during a pressure phase while limiting the pressure to a maximum of 20 bars by releasing the steam, m the subsequent expansion phase, continue stirring at 280° C. and slowly lower the pressure to 1 bar and degas for approx. 3 hours more. After the desired agitator torque is reached, empty the mixture through boreholes of approx. 5 mm. Conduct the emerging polymer strands through a water bath, cool them, and cut into granulate. Next, dry for 12 hours at 90° C. in a tumble drier under nitrogen. There emerges a colorless, glassy polyamide with a glass point of 130° C. and a relative viscosity of 1.45, measured in 0.5% m-cresol solution. The characteristics of the polymer are summarized in Table 1.

The fabrication of molded parts from the dried granulate is performed on an Arburg injection molding machine. The melt temperature is set between 260 and 280° C., while the mold temperature is between 50 and 80° C. The characteristics of the molded parts are summarized in Table 1.

EXAMPLES 3 AND 8

(According to Invention)

Suspend 6.44 kg hexamethylenediamine, 8.75 kg m-xylenediamine, 13.13 kg isophthalic acid, 6.56 kg terephthalic acid, and 125 g acetic acid in 40 kg water in a 130 l pressure autoclave and heat 2 hours at 140° C., whereby a pressure of approx. 3.5 bars sets in. m contrast to the usual procedure, skip the pressure phase and perform expansion immediately. Heat to 260° C. with simultaneous expansion, so that the pressure inside the boiler is always under 4 bars. Next, stir further and lower the pressure slowly to 1 bar, then degas another 3 hours. After the desired agitator torque is reached, empty the mixture through boreholes of approx. 5 mm. Conduct the emerging polymer strands through a water bath, cool them, and cut into granulate. Next, dry for 12 hours at 100° C. in a tumble drier under nitrogen. There emerges a colorless, glassy polyamide with a glass point of 139 to 141° C. and a relative viscosity of 1.42 to 1.45, measured in 0.5% m-cresol solution. The characteristics of the polymer are summarized in Table 1.

The fabrication of molded parts from the dried granulate is performed on an Arburg injection molding machine. The melt temperature is set between 250 and 275° C., while the mold temperature is between 30 and 50° C. The characteristics of the molded parts are summarized in Table 1.

EXAMPLES 4, 5, 6 AND 7

(According to the Invention)

Produce the polyamide in Examples 4, 5, 6 and 7 analogously to Example 3 with increasing amounts of m-xylenediamine as listed in Table 1. The characteristics of the polymer are summarized in Table 1.

The molded parts are produced from the dried granulate on an Arburg injection molding machine. The melt temperature is set between 250 and 275° C.; the mold temperature is 30 to 50° C. The characteristics of the molded parts are summarized in Table 1.

EXAMPLE 9

(According to Invention)

Suspend 14,1 kg hexamethylenediamine, 3.5 kg naphthalenedicarboxylic acid 2,6 [sic, p.17], 17.2 kg isophthalic acid, and 230 g acetic acid in 40 kg water in a 130 l pressure autoclave and heat 2 hours at 260° C., while limiting the pressure to a maximum of 4 bars by releasing the steam. Continue stirring at 260° C., and slowly lower the pressure to 1 bar and degas for approx. 3 hours more. After the desired agitator torque is reached, empty the mixture through boreholes of approx. 5 mm. Conduct the emerging polymer strands through a water bath, cool them, and cut into granulate. Next, dry for 12 hours at 90° C. in a tumble drier under nitrogen. There emerges a colorless, glassy polyamide with a glass point of 132° C. and a relative viscosity of 1.48, measured in 0.5% m-cresol solution. The characteristics of the polymer are summarized in Table 1.

The fabrication of molded parts from the dried granulate is performed on an Arburg injection molding machine. The melt temperature is set between 250 and 275° C., while the mold temperature is between 30 and 50° C. The characteristics of the molded parts are summarized in Table 1.

| | | | | | Examples | | | | |
|---|---|---|---|---|---|---|---|---|---|
| | VB1 TR55 | VB2 G21 | B3 | B4 | B5 | B6 | B7 | B8 | B9 |
| MXD (wt %) | | | 10.0 | 15.0 | 20.0 | 25.5 | 30.0 | 10.0 | |
| HMD (wt %) | | 41.1 | 32.4 | 27.4 | 23.1 | 18.4 | 13.9 | 32.4 | 40.6 |
| IPS (wt %) | | 38.7 | 38.4 | 38.0 | 38.0 | 37.3 | 37.4 | 38.4 | 49.4 |
| TPS (wt %) | | 19.3 | 19.2 | 19.6 | 18.9 | 18.8 | 18.7 | 19.2 | |
| 2,6-NDC (wt %) | | | | | | | | | 10.0 |
| Values Dry | | | | | | | | | |
| Tg(° C.)/DSC | 165 | 130 | 139 | 144 | 147 | 153 | 162 | 141 | 132 |
| Melt temp (° C.) | | | | | | | | | |
| Density (g/cm$^3$) | 1.06 | 1.191 | 1.194 | 1.197 | 1.213 | 1.223 | 1.230 | 1.206 | 1.191 |
| MVI275° C/5 kg (cm$^3$/10 min) | 20 | 40 | 48 | 48 | 45 | 51 | 32 | 24 | 22 |
| r.V. 0.5% m-Cresol | 1.55 | 1.45 | 1.42 | 1.39 | 1.39 | 1.35 | 1.36 | 1.45 | 1.48 |
| E-mod. (MPa) | 2300 | 2900 | 3200 | 3400 | 3500 | 3700 | 4000 | 3100 | 2800 |
| KSZ kJ/m$^2$ | 7 | 6 | 2.8 | 1.3 | 1.0 | 0.9 | 1.5 | 5.6 | 6.6 |
| Light transm. 3 mm/ 540 nm (%) | 90 | 80 | 82 | 80 | 75 | 83 | 80 | 81 | 75 |
| Index of refraction $n_D^{20}$ | 1.537 | 1.589 | 1.604 | 1.609 | 1.613 | 1.621 | 1.627 | 1.603 | 1.601 |
| Values cond | | | | | | | | | |
| Shore D | 83 | 85 | 86 | 86 | 87 | 88 | 90 | 86 | 86 |

TR55: Grilamid ® TR55 (Ems Chemie)
G21: Grivory ® G21 (Ems Chemie)
r.V. 0.5% m-Cr = relative viscosity, measured 0.5% in m-cresol
MVI = melt viscosity index Measuring the Characteristics The characteristics referenced "cond" were measured on conditioned test bodies. The conditioning was carried out according to ISO 1110. All remaining characteristics were determined on dry test bodies.

The measurement of the thermal data was performed on the granulate (dry: 120° C./24 h) in a Perkin Elmer DSC apparatus with heating rates of 20° C./min and cooling rates of 5° C./min.

The melt temperature was measured according to ISO 3146-C. Crystallization temperature, crystallization enthalpy, and crystallization rate were determined in the first cooling cycle (5° C./min). In order to determine the glass temperature Tg, the sample was heated to Tg+20° C. and quenched and then measured in the second heating cycle (20° C./min).

The density was determined at 20° C. in the pycnometer at cutouts of molded parts.

The MVI was determined on a Gottfert machine according to DIN 53735/ISO 1133. The heating time is 4 minutes at 275° C. The measurement occurs under a weight of 5 kg.

The mechanical characteristics of E-modulus, tensile strength, and elongation at break were determined by tensile testing on standard test bodies according to IS0527.

The measurement of impact strength, (SZ) and notch impact strength (KSZ) were determined according to Charpy at 23° according to ISO 179eU and ISO 179eA.

The light transmission was measured with a Perkin Elmer UV device in the region from 200 to 800 nm on 50×30×3 mm color wafers. The transmission value is given for the 540 nm (3 mm) wavelength.

The refractive index was determined with daylight on color wafers measuring 50×30×3 mm on an Abbe refractometer. The indexes of refraction are $n_D^{20}$ values.

The hardness Shore D was determined according to ISO 868 at room temperature on conditioned samples.

The invention claimed is:

1. Transparent thermoplastic polyamide molding materials based on copolyamides with a refractive index $n_D^{20}$ above 1.59 with a primary proportion by weight of diamines and dicarboxylic acids with aromatic cores, characterized by the following chains, represented by Formula I:

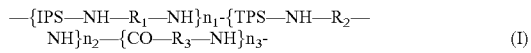

where:

$n_1$=40 to 100 wt %

$n_2$=60 to 0 wt %

$n_3$=0 to 30 wt %, and where the proportions, in wt %, of $n_1$, $n_2$, and $n_3$ total 100%, whereby the diamines with the cores $R_1$, $R_2$ can be identical or different, and at least 30 mol % diamines in relation to 100 mol % diamines consist of para-xylene or meta-xylene units and can consist of linear aliphatic or branched aliphatic chains with 2 to 12 (CH$_2$) units or chains with cycloaliphatic cores which can be incorporated individually or as blends, and whereby 100 mol % of the dicarboxylic acids consist of at least 40 mol % isophthalic acid (IPS) and, as a residue, terephthalic acid (TPS), which can be replaced partly or wholly by naphthalene dicarboxylic acids, whereby up to 30 wt % of the copolyamides of the molding compounds can be replaced by amino acids or lactams with core $R_3$, consisting of chains with 5 to 11 (CH$_2$) units.

2. Transparent thermoplastic polyamide molding materials with a refractive index $n_D^{20}$ above 1.59 as claimed in claim 1, wherein the copolyamides have the composition according to Formula II:

with the following mol % proportions of the respective components:

20 to 100 mol % meta-xylylenediamine (MXD)

80 to 0 mol % hexamethylenediamine (6)

50 to 100 mol % isophthalic acid (I) and 50 to 0 mol % terephthalic acid (T) in relation to 100 mol % diamine and 100 mol % dicarboxylic acids, whereby meta-xylylenediamine can be wholly or partly replaced by para-xylylenediamine, and terephthalic acid wholly or partly by Naphthalenedicarboxylic acid, whereby symmetric isomers asymmetric isomers or blends thereof can be incorporated.

3. Transparent thermoplastic polyamide molding materials claimed in claim 1 with a refractive index $n_D^{20}$ above 1.59 wherein the copolyamides have the composition according to Formula II:

with the following mol % portions of the respective components:

20 to 80 mol % meta-xylylenediamine (MXD)

80 to 20 mol % hexamethylenediamine (6)

60 to 80 mol % isophthalic acid (I) and 40 to 20 mol % terephthalic acid (T) in relation to 100 mol % diamine and 100 mol % dicarboxylic acids.

4. Transparent thermoplastic polyamide molding materials claimed in claim 1 with a refractive index $n_D^{20}$ above 1.59 wherein the copolyamides have the composition according to Formula III:

with the following proportions, in mol %, of the respective components: 20 to 80 mol % naphthalenedicarboxylic acid (NDC), with symmetric or asymmetric substitute positions or combinations thereof, 40 to 20 mol % isophthalic acid (I), 40 to 0 mol % terephthalic acid (T) and 100 mol % hexamethylenediamine (6), which can be wholly or partly replaced by ethylenediamine, trimethylhexamethylenediamine, or linear diamines with 8 to 12 CH$_2$ groups or cycloaliphatic diamines such as norbornanediamine, 4,4-diaminodicyclohexylmethane, 3,3-dimethyl-4,4-diaminodicyclohexylmethane or blends thereof, in relation to 100 mol % diamine and 100 mol % dicarboxylic acids.

5. Polyamide molding materials according to one of the claims 1 to 4, wherein the copolyamides contain at least 50 mol % diamines with aromatic cores relation to 100 mol % diamine.

6. Polyamide molding materials claimed in one of the claims 1 to 4, wherein up to 5 mol % of the diamines and/or the dicarboxylic acids with aromatic cores can be replaced by branched or unbranched aliphatic diamines with 2 to 12 (CH$_2$) units or aliphatic dicarboxylic acids with 2 to 12 CH$_2$ units, which can be branched or unbranched.

7. Polyamide molding materials claimed in claim 6, wherein contained in the chains of the copolyamides, there are up to 5 mol % cycloaliphatic diamines or cycloaliphatic dicarboxylic acids.

8. Polyamide molding materials claimed in one of the claims 1 to 4, wherein, in order to accelerate the reaction, phosphorous catalysts are added to the aqueous mixture during the polycondensation in amounts equaling 0.01 to 0.2 wt %.

9. Polyamide molding materials claimed in one of the claims 1 to 4, wherein phosphorous stabilizers, or metal ions or organic linear or cyclic residues or sterically hindered phenols, are incorporated in amounts equaling 0.01 to 0.2 wt % for stabilizing the color in the course of polymerization and later processing.

10. Polyamide molding materials claimed in one of the claims 1 to 4, wherein, in order to control the chain length, either monofunctional amines or monofunctional acids are polymerized in, or an excess of diamine or dicarboxylic acid is used.

11. Polyamide molding materials claimed in claim 10, wherein aliphatic or cycloaliphatic amines are used as monofunctional amines, and aliphatic, cycloaliphatic, or aromatic acids are used as monofunctional acids.

12. Polyamide molding materials claimed in any of the preceding claims 1 to 4, wherein the copolyamides have a relative viscosity (r.V.) of from 1.33 to 1.65, measured 0.5% in m-cresol.

13. Method for producing molded bodies from the molding materials claimed in one or more of the claims 1 to 12, wherein the known methods for thermoplastics are applied for remolding the granulate that is produced from the molding compounds into optical lenses or lens blanks.

14. Method for processing the polyamide molding materials claimed in claim 13, wherein films or other molded parts—with polarization characteristics or with UV absorbers that filter out UV light under 400 nm, or dyes for tinting the lenses, or additives that alter their appearance based on temperature effects, or thermochromatic additives that alter the tint depending on the temperature or depending on the wavelength of the incoming light—are back-injected.

15. Method for processing the molded bodies that are produced from the molding materials claimed in claim 13 or 14, comprising the varnishing of the surfaces with hardcoat, softcoat, or UV protection varnish, evaporation coating with carbon or metal atoms, plasma treatment, and layer polymerization.

16. Optical lenses for eyeglasses, wherein they are produced with molding materials claimed in one of the claims 1 to 12 and the method claimed in claim 13 or 14.

17. Optical lenses for cameras, binoculars, microscopes, electro-optical measuring and testing devices, optical filters, headlight lenses, lamp lenses, projectors and video projectors, viewing windows, and gage glasses, wherein they are produced with molding materials claimed in one of the claims 1 to 12 and the method claimed in claim 13 or 14.

18. Utilizing the inventive molding materials claimed in one of the claims 1 to 12 for producing blends or alloys, wherein amorphous or semi-crystalline polyamides are used as blend or alloy components, these being furnished with the usual additives.

19. Polyamide molding materials according to claim 1, wherein the copolyamides have a refractive index $n_D^{20}$ above 1.6.

20. Transparent thermoplastic polyamide molding material as claimed in claim 2, wherein meta-xylylenediamine can be wholly or partly replaced by para-xylylenediamine, and terephthalic acid wholly or partly by naphthalenedicarboxylic acid, whereby asymmetric isomers or blends of asymmetric isomers and symmetric isomers are incorporated.

21. Transparent thermoplastic polyamide molding material as claimed in claim 4, wherein the naphthalenedicarboxylic acid (NDC) is a 2,6-naphthalenedicarboxylic acid.

22. Polyamide molding material as claimed in claim 5, wherein at least 50 mole-% diamines with aromatic cores are selected from the group consisting of meta-xylylenediamine and para-xylylenediamine.

23. Polyamide molding material as claimed in claim 7, wherein the skeletons are selected from the group consisting of norbornyl, cyclohexyl, or dicyclohexyl methane, dicyclohexylpropane, di(methylcyclohexyl)methane, di(methylcyclohexyl)propane.

24. Polyamide molding material as claimed in claim 8, wherein the phosphorous catalysts are selected from the group consisting of $H_3PO_2$, $H_3PO_3$, $H_3PO_4$.

25. Polyamide molding material as claimed in claim 9, wherein the phosphorous stabilizers are of the type $R_3PO_2$, $R_3PO_3$, $R_3PO_4$ with R=H.

26. Polyamide molding material as claimed in claim 10, wherein controller types have stabilizer functions which are selected from the group consisting of multi-substituted piperidyl groups and tertiary butyl phenyl groups.

27. Polyamide molding material as claimed in claim 11, wherein said amines are selected from the group consisting of hexylamines and cyclohexylamines.

28. Polyamide molding material as claimed in claim 11, wherein said acids are selected from the group consisting of acids from the benzoic, acetic, and propionic groups.

29. Method as claimed in claim 13, wherein the applied method for thermoplastics is injection molding in multi-cavity or mono-cavity tools.

30. Utilizing the molding materials as claimed in claim 18, wherein the used additives are selected from the group consisting of strengtheners, nanoparticles, impact strength modifiers, dyes, flame retardants, softeners, stabilizers, and lubricants.

* * * * *